(12) United States Patent
Beckelman et al.

(10) Patent No.: US 9,754,331 B1
(45) Date of Patent: Sep. 5, 2017

(54) SYSTEM AND METHOD FOR MANAGING GROUP ORDERS

(71) Applicant: GRUBHUB HOLDINGS INC., Chicago, IL (US)

(72) Inventors: William Jackson Beckelman, Bountiful, UT (US); Brett William Beardall, Bountiful, UT (US); Laura Elizabeth End, New York, NY (US); Jayson Uffens, Draper, UT (US); Sarah Caliendo, Brooklyn, NY (US); Matthew Maloney, Chicago, IL (US)

(*) Notice: Subject to any disclaimer, the term of this patent is extended or adjusted under 35 U.S.C. 154(b) by 380 days.

(21) Appl. No.: 14/168,420

(22) Filed: Jan. 30, 2014

(51) Int. Cl.
*G06Q 50/12* (2012.01)
*G06Q 10/10* (2012.01)

(52) U.S. Cl.
CPC .......... *G06Q 50/12* (2013.01); *G06Q 10/10* (2013.01)

(58) Field of Classification Search
None
See application file for complete search history.

(56) References Cited

U.S. PATENT DOCUMENTS

| | | |
|---|---|---|
| 4,530,067 A | 7/1985 | Dorr |
| 4,547,851 A | 10/1985 | Kurland |
| 5,189,411 A | 2/1993 | Collar |
| 5,272,474 A | 12/1993 | Hilliard |
| 5,367,557 A | 11/1994 | Ozenbaugh |
| 5,510,979 A | 4/1996 | Moderi |
| 5,570,283 A | 10/1996 | Shoolery |
| 5,745,681 A | 4/1998 | Levine |
| 5,751,958 A | 5/1998 | Zweben |
| 5,774,670 A | 6/1998 | Montulli |
| 5,781,189 A | 7/1998 | Holleran |
| 5,835,896 A | 11/1998 | Fisher |
| 5,838,798 A | 11/1998 | Stevens |
| 5,839,115 A | 11/1998 | Coleman |
| 5,842,176 A | 11/1998 | Hunt |
| 5,845,263 A | 12/1998 | Camaisa |
| 5,850,214 A | 12/1998 | McNally |
| 5,912,743 A | 6/1999 | Kinebuchi |
| 5,948,040 A | 9/1999 | DeLorme |
| 5,966,068 A | 10/1999 | Wicks |
| 5,970,474 A | 10/1999 | LeRoy |
| 5,991,739 A | 11/1999 | Cupps et al. |

(Continued)

FOREIGN PATENT DOCUMENTS

| | | |
|---|---|---|
| EP | 0 844 579 A2 | 5/1998 |
| EP | 0 856 812 A2 | 5/1998 |

(Continued)

OTHER PUBLICATIONS

About Us, Compuwave Technologies Inc., Feb. 7, 2001.

(Continued)

*Primary Examiner* — Paul Danneman
(74) *Attorney, Agent, or Firm* — Hickman Palermo Becker Bingham LLP

(57) ABSTRACT

A method for managing group orders operates within a restaurant service system. Diners access the restaurant service system to build and place group orders. Each group order is sent to one or more restaurant service devices of the serving restaurants. Each restaurant service device displays a group order with a set of group order indicators.

18 Claims, 17 Drawing Sheets

(56) References Cited

U.S. PATENT DOCUMENTS

| | | | |
|---|---|---|---|
| 6,088,681 A * | 7/2000 | Coleman | G06Q 10/06315 705/15 |
| 6,134,548 A | 10/2000 | Gottsman | |
| 6,167,255 A | 12/2000 | Kennedy | |
| 6,175,922 B1 | 1/2001 | Wang | |
| 6,208,976 B1 | 3/2001 | Kinebuchi | |
| 6,236,974 B1 | 5/2001 | Kolawa | |
| 6,282,491 B1 | 8/2001 | Bochmann | |
| 6,295,541 B1 | 9/2001 | Bodnar | |
| 6,300,947 B1 | 10/2001 | Kanevsky | |
| 6,341,268 B2 | 1/2002 | Walker | |
| 6,356,543 B2 | 3/2002 | Hall | |
| 6,366,650 B1 | 4/2002 | Rhie | |
| 6,415,138 B2 | 7/2002 | Sirola | |
| 6,590,588 B2 | 7/2003 | Lincke | |
| 6,594,347 B1 | 7/2003 | Calder | |
| 6,836,537 B1 | 12/2004 | Zirngibl | |
| 6,873,693 B1 | 3/2005 | Langseth | |
| 6,973,437 B1 | 12/2005 | Olewicz | |
| 7,069,228 B1 | 6/2006 | Rose | |
| 7,216,152 B2 | 5/2007 | Short | |
| 7,359,871 B1 | 4/2008 | Paasche | |
| 7,386,477 B2 | 6/2008 | Fano | |
| 7,437,305 B1 | 10/2008 | Kantarjiev | |
| 7,966,215 B1 | 6/2011 | Myers | |
| 8,073,723 B1 | 12/2011 | Bilibin et al. | |
| 8,326,705 B2 | 12/2012 | Niessen et al. | |
| 8,341,003 B1 | 12/2012 | Bilibin et al. | |
| 2001/0047301 A1 | 11/2001 | Walker | |
| 2002/0005430 A1 | 1/2002 | Pentel | |
| 2002/0046093 A1 | 4/2002 | Miller | |
| 2002/0107747 A1 | 8/2002 | Gerogianni | |
| 2002/0143655 A1 | 10/2002 | Elston | |
| 2002/0178034 A1 | 11/2002 | Gardner | |
| 2005/0004843 A1 | 1/2005 | Heflin | |
| 2005/0049940 A1 | 3/2005 | Tengler | |
| 2006/0080176 A1 | 4/2006 | Sutcliffe | |
| 2006/0184882 A1 * | 8/2006 | Molander | G06F 9/4443 715/733 |
| 2007/0011061 A1 | 1/2007 | East | |
| 2007/0150375 A1 | 6/2007 | Yang | |
| 2007/0294129 A1 | 12/2007 | Froseth et al. | |
| 2008/0076451 A1 | 3/2008 | Sheha et al. | |
| 2008/0104059 A1 | 5/2008 | Segel | |
| 2009/0048890 A1 | 2/2009 | Burgh | |
| 2009/0150193 A1 | 6/2009 | Hong | |
| 2009/0167553 A1 * | 7/2009 | Hong | G06Q 10/02 340/4.61 |
| 2009/0204492 A1 | 8/2009 | Scifo et al. | |
| 2009/0307096 A1 | 12/2009 | Antonellis | |
| 2010/0070376 A1 | 3/2010 | Proud et al. | |
| 2011/0040642 A1 | 2/2011 | O'Dell | |
| 2011/0191194 A1 | 8/2011 | Lutnick et al. | |
| 2011/0208617 A1 | 8/2011 | Weiland | |
| 2011/0258011 A1 * | 10/2011 | Burns | G06Q 10/06 705/7.15 |
| 2012/0203619 A1 | 8/2012 | Lutnick et al. | |
| 2012/0290413 A1 | 11/2012 | Harman | |
| 2013/0038800 A1 | 2/2013 | Yoo | |
| 2013/0103605 A1 | 4/2013 | Villegas | |
| 2013/0144764 A1 | 6/2013 | Walling, III | |

FOREIGN PATENT DOCUMENTS

| | | |
|---|---|---|
| EP | 1 081 625 A2 | 7/2001 |
| JP | 62-050919 | 3/1987 |
| JP | 5-40767 | 2/1993 |
| JP | 6-52195 | 2/1994 |
| JP | 6-203051 | 7/1994 |
| JP | 9-160972 | 6/1997 |
| JP | 9-204466 | 8/1997 |
| JP | 9-296819 | 11/1997 |
| JP | 9-325988 | 12/1997 |
| JP | 9-330470 | 12/1997 |
| JP | 10-011194 | 1/1998 |
| JP | 10-224549 | 8/1998 |
| JP | 11-126147 | 5/1999 |
| JP | 11-191035 | 7/1999 |
| JP | 11-202974 | 7/1999 |
| WO | WO 95/34040 A1 | 12/1995 |
| WO | WO 97/08635 A1 | 3/1997 |
| WO | WO 98/35311 A1 | 8/1998 |
| WO | WO 99/17236 A1 | 4/1999 |

OTHER PUBLICATIONS

Wireless Products, Compuwave Technologies Inc., Feb. 7, 2001.
Micros Systems, Inc., POS Configurator User's Guide, 3700 POS, Micros Systems, Inc., 1998.
Micros Systems, Inc., New Products, Micros Systems, Inc., Nov. 11, 1996.
Rita Marie Emmer, Marketing Hotels: Using Global Distribution System, Cornell Hotel and Restaurant Administration Quarterly, 1993, 34; 80, DOI: 10.1177/001088049303400614.
T. Imielinski, Adaptive Wireless Information Systems, 1994.
IBM, POS Computer, 1998.
Krishna Bharat, Migratory Applications.
Andrew Fano, Shopper's Eye: Using Lcoation-based filtering for a shopping agent in the physical world, 1998.
Len Lewis, Opening the gates, Progressive Grover, Jul. 1998.
Arthur Keller, The DIANA approach to mobile computing, CiteSeer, 1995.
A Chavez, A real-life experiment in creating an agent marketplace, PAAM, 1997.
Richard De Santa, Are you into your customers?, Supermarket Business, Jan. 1997.
Barron Housel, WebExpress: a system for optimizing web browsing in a wireless environment.
Carrie Lehman, Service connects restaurants, customers via orders by Internet, Alaska Journal of Commerce, Apr. 28, 1997.
Jennifer Rowley, Internet food retailing: the UK in context, ProQuest LLC, 1998.
John Soeder, Cyber Solicitation, Restaurant Hospitality, Sep. 1997.
U.S. Appl. No. 60/131,119, filed Apr. 27, 1999, Robert Showghi.
U.S. Appl. No. 60/083,651, filed Apr. 30, 1998, Theodore Chen.
Kevin Crowston, Understanding Processes in Organizations, Jul. 1998.
Engaging Customers Across All Touch Points: A Roadmap for Leading Retailers, Blue Martini Software, Inc., www.bluemartini.com.
Chuck Andraka, Put your database on the Web, Data Based Advisor, v14, n6, p12, Jun. 1996.
Steven Vaughan-Nichols, Unleashing Databases on the Web—True wealth and power belong to those who control information access, Netguide, 1996, n307, PG111.
P.L. Olympia, Cold Fusion 1.5; Autobahn, DBMS, v9, n8, p. 33, Jul. 1996.
eshop.com, eShop Technology, eshop.com, Jan. 1, 1996.
eshop.com, eShip Technology Merchant Manual, eShop.com, Feb. 21, 1996.
Kambe Tomonari, Screen design simulator "U-face", Information Processing Society of Japan (IPSJ) The 39th National convention colleciton of papers, 1457-1458, Oct. 16, 1989.
Kato Kiyosh, A Prototype of a User Interface Software for Portable Terminal with a Small Display Screen, Information Processing Society of Japan (IPSJ) The 53rd National co . . . .
Squirrel Systems, May 8, 1999, http://web.archive.org/web/19990508153731/www.squirrelsystems.com/about/company.
Robin Berger, POS Positions Spago for Growth, Squirrel Systems, Apr./May 1997.
Squirrel Systems, POS System, May 8, 1999, http://web.archive.org/web/19990508175824/www.squirrelsystems.com/products/newsq . . . .
Squirrel Systems, Squirrel Restaurant Management System.
Squirrel Systems, Press Releases, Squirrel Systems, Aug. 20, 1998.

(56) References Cited

OTHER PUBLICATIONS

Business Editors, Fujitsu and Sulcus Hospitality Group partner to develop first wireless computer for restaurant industry, Business Wire, Aug. 30, 1993.
Sulcus's Squirrel and cybermeals Ink Technology Alliance, Business Wire, Feb. 24, 1998.
Accel Partners Invest $10 Million incybermeals, Business Wire, May 28, 1998.
Rev Share Information, Cybermeals, Jan. 24, 1998.
Squirrel point-of-sale software, Squirrel Systems, Oct. 10, 1999.
Chapter 4—Wireless Data, Wireless Technologies and the National Information Infrastructure, Diane Pub Co, Oct. 1995.
Brew Moon Management Toasts Squirrel's "Seamless Solution", Squirrel Systems, Nov. 1998.
Squirrel Systems, Squirrel® Customer Profile: Chevys Fresh Mex®, Squirrel Systems—Restaurant Management, Aug. 1998.
Micro Systems, Inc., Appendix, User's Manual, 8700 HMS Version 2.10, micros Systems, Inc., 1995-1997.
Micro Systems, Inc., Chapter 1-11, User's Manual, 8700 HMS Version 2.10, micros Systems, Inc., 1995-1997.
Micro Systems, Inc., Full Service Operations, Micros 3700 Point-of-Sale System, Micro Systems, Inc., Nov. 11, 1996.
Micro Systems, Inc., New Products, Micros 3700 Point-of-Sale System, Micro Systems, Inc., Nov. 11, 1996.
Micro Systems, Inc., Quick Service Operations, Micro Systems, Inc., Nov. 11, 1996.
Micro Systems, Inc., All About Us, Micro Systems, Inc., Nov. 11, 1996.
Micro Systems, Inc., Full Service Operations, Micro Systems, Inc., Nov. 11, 1996.
Micro Systems, Inc., 8700 HMS Product Overview, Micro Systems, Inc., 2000.
Micro Systems, Inc., Micros Hand-Held TouchScreen, Micro Systems, Inc., Sep. 1992.
Micro Systems, Inc., The Micro 2700 HMS Touchscreen, Micro Systems, Inc.
RMS Touch, RMS-Touch—Touch Screen Restaurant Management System Product Description, RMSTouch.com, Feb. 15, 1997.
RMS Touch, Company Profile RMS, Touch.com, Integrated Restaurant Software, Feb. 15, 1997.
Elite32 Restaurant System, Compuwave Technologies Inc., 2000.
POS Infrared Restaurant System, Compuwave Technologies Inc., 2000.
Wireless POS Drive-Through System, Compuwave Technologies Inc., 2000.
Compuware Technologies Approved as Supplier to McDonald's Canda, Compuwave Technologies Inc., Sep. 14, 2000.
Wireless Restaurant System, Compuwave Technologies Inc., Feb. 7, 2001.

\* cited by examiner

| |
|---|
| Group order ID — 702 |
| Order category — 704 |
| Order contact — 706 |
| Order contact telephone number — 708 |
| Order contact Email address — 710 |
| Delivery instruction — 712 |
| Delivery address — 714 |
| Order description — 716 |
| Total price of ordered items — 718 |
| Sales tax — 720 |
| Additional tax — 722 |
| Delivery fee — 724 |
| Additional delivery fee — 726 |
| Gratuity amount — 728 |
| Order total price — 730 |
| Order receive time — 732 |
| Order confirmation time — 734 |
| Order out-for-delivery time — 736 |
| Order delivered time — 738 |
| Count of suborders — 740 |
| Serving restaurant ID — 742 |

| 900 | |
|---|---|
| Catering order ID | 902 |
| Order category | 904 |
| Order contact | 906 |
| Order contact telephone number | 908 |
| Order contact Email address | 910 |
| Delivery instruction | 912 |
| Delivery address | 914 |
| Order description | 916 |
| Total price of ordered items | 918 |
| Sales tax | 920 |
| Additional tax | 922 |
| Delivery fee | 924 |
| Additional delivery fee | 926 |
| Gratuity amount | 928 |
| Order total price | 930 |
| Order receive time | 932 |
| Order confirmation time | 934 |
| Order out-for-delivery time | 936 |
| Order delivered time | 938 |
| Policy | 940 |
| Cut-off time | 942 |
| Lead time | 944 |
| Host | 946 |
| Secondary contact | 948 |
| Setup instructions | 950 |
| Note to caterer | 952 |
| Serving restaurant ID | 954 |

SYSTEM AND METHOD FOR MANAGING GROUP ORDERS

CROSS REFERENCE TO RELATED APPLICATIONS

None.

FIELD OF THE DISCLOSURE

The present invention relates to a system and method for managing orders for a restaurant within a restaurant service, and more particularly relates to a system and method for managing and processing group orders for a restaurant within a restaurant service.

DESCRIPTION OF BACKGROUND

A restaurant service usually includes hundreds or thousands of participating restaurants. The restaurant service aggregates the participating restaurants menus, each of which includes a plurality (meaning more than one) of menu items. The menus and menu items are stored in a database within a restaurant service system that empowers and provides the restaurant service. The restaurant service system also stores additional information about the participating restaurants. For example, the location, cuisine type, service hours, types of services, delivery area, and various service fees of each participating restaurant are stored in the database.

The restaurant service system is usually accessible over the Internet. Diners use a computer (such as a desktop computer, a laptop computer, a tablet computer or a smartphone) to access web pages provided by the restaurant service system. The web pages allow the diners to search and find desired restaurants and menu items. Diners further use the web pages to build and place food orders. The restaurant service system then sends orders to the respective serving restaurants for the orders to be processed.

The restaurants receive the orders using, for example, an Internet connection, a fax, or a telephone call. For various reasons, such as convenience and mobility, many restaurants prefer to use mobile communications devices to manage their orders. Usually, after a restaurant receives an order, it acknowledges or confirms the order first. By confirming the order, the restaurant commits itself to prepare food for the order. The order is then presented to a chef for food preparation. The order can be a pick-up order, or a delivery order. A pick-up order is prepared by the restaurant and picked up by the corresponding diner or diners. A delivery order is delivered to the diner by a delivery person (also known as delivery driver). After the order is prepared, the restaurant marks the status of the order as ready-for-pick-up or out-for-delivery. Alternatively, once the delivery order has left the restaurant for delivery, the status of the order is marked as out-for-delivery. After the order has been delivered to the diner, its status becomes delivered.

Each order can be an individual order or a group order. An individual order is a single order for food, while a group order is for a group of individuals, and includes a plurality of suborders (also referred to herein as individual orders), each of which includes one or more menu items (also referred to herein as suborder items) and serves one individual. Each suborder may also include a set (meaning one or more) of instructions, such as instructions concerning food preparation and delivery. Additionally, the group order can include a set of instructions about delivery, food preparation, utensils, etc. Group orders are important to any restaurant since they bring in much larger amounts of revenue than individual orders.

Accordingly, there is a need for a system and method for efficient management of orders, and group orders in particular, by a restaurant. There is a further need for a mobile communication device to effectively manage group orders that would fill a long-felt need.

OBJECTS OF THE DISCLOSED SYSTEM, METHOD, AND APPARATUS

Accordingly, it is an object of this disclosure to provide a system and method for managing group orders.

Another object of this disclosure is to provide a restaurant service device for managing group orders.

Another object of this disclosure is to provide a restaurant service device for managing catering orders.

Another object of this disclosure is to provide a mobile restaurant service device for managing group orders.

Another object of this disclosure is to provide a system and method for displaying group orders.

Another object of this disclosure is to provide a system and method for displaying group orders with a group order indicator.

Another object of this disclosure is to provide a system and method for displaying group orders with a plurality of group order indicators.

Another object of this disclosure is to provide a system and method for automatically printing group orders.

Another object of this disclosure is to provide a system and method for providing reminders on group orders.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a method and system for managing group orders for restaurants participating in a restaurant service. In accordance with the present teachings, the method operating within a restaurant service system includes receiving a group order from a diner device over a wide area network. The group order includes a plurality of suborders. Each suborder includes a set of suborder items. The method further includes storing the group order into a database, and sending the group order to a restaurant service device of a restaurant over the Internet. The restaurant is the serving restaurant for the group order. Moreover, the method includes the restaurant service device receiving the group order, and the restaurant service device displaying the group order on a screen of the restaurant service device with a first set of group order indicators.

Further in accordance with the present teachings is a restaurant service system for managing group orders for restaurants participating in a restaurant service. The restaurant service system includes a first server including a first processor and a first network interface coupled to the first processor and adaptively coupled to a database. The restaurant service system also includes a second server including a second processor and a second network interface coupled to the second processor and adaptively coupled to the database. Additionally, the restaurant service system includes a diner device, and a mobile service device including a screen, a touchscreen, a mobile device processor and a wireless network interface coupled to the mobile device processor. Moreover, the restaurant service system includes a first server software application operating on the first processor, and a second server software application operating on the second processor. The first server software application is adapted to receive a group order from the diner device over the first network interface. The group order includes a plurality of suborders wherein each suborder includes a set of suborder items. The first server software application is further adapted to store the group order into the database. The second server software application is adapted to retrieve the group order from the database and send the group order to the mobile service device over the second network interface. The restaurant service system further includes a mobile software application operating on the mobile device processor. The mobile software application is adapted to receive the group order over the wireless network interface, and display the group order on the screen of the mobile service device with a first set of group order indicators.

Further in accordance with the present teachings is a restaurant service system for managing catering orders for restaurants participating in a restaurant service. The restaurant service system includes a first server including a first processor and a first network interface coupled to the first processor and adaptively coupled to a database. Additionally, the restaurant service system includes a second server including a second processor and a second network interface coupled to the second processor and adaptively coupled to the database. The restaurant service system also includes a diner device, and a restaurant service device including a screen, a touchscreen, a third processor and a third network interface coupled to the third processor. The restaurant service system further includes a first server software application operating on the first processor. The first server software application is adapted to receive a catering order from the diner device over the first network interface, and store the catering order into the database. The catering order includes a set of catering order items. Moreover, the restaurant service system further includes a second server software application operating on the second processor. The second server software application is adapted to retrieve the catering order from the database and send the catering order to the restaurant service device over the second network interface. Furthermore, the restaurant service system includes a third software application operating on the third processor. The third restaurant software application is adapted to receive the catering order over the third network interface, and display the catering order on the screen of the restaurant service device with a first set of catering order indicators and a number of servings of the catering order. Additionally, the third restaurant software application is adapted to, in response to an input, send a catering order status update request to the second server software application. The second server software application stores the status update for the catering order into the database.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 7 is a table illustrating a sample group order in accordance with the teachings of this disclosure;

FIG. 9 is a table illustrating a sample catering order in accordance with the teachings of this disclosure;

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
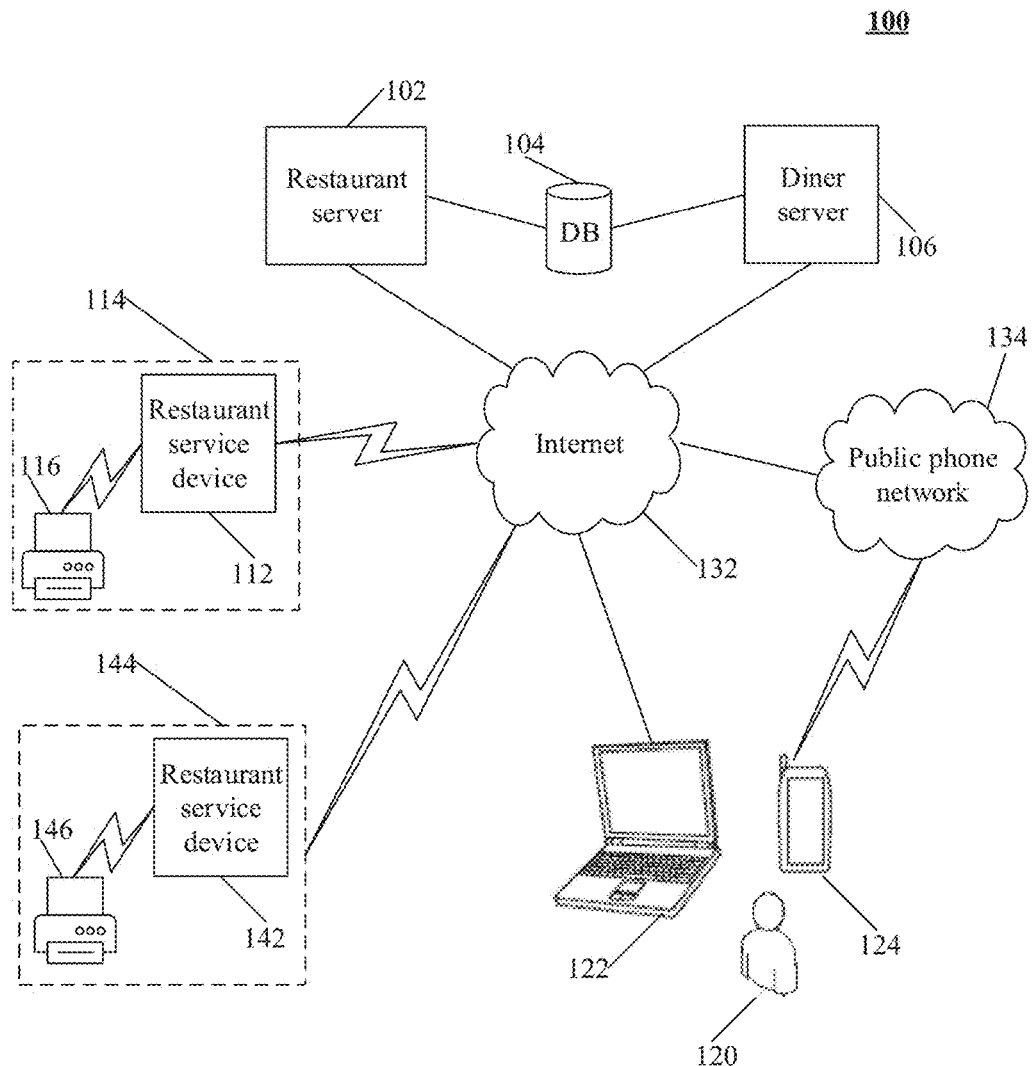
FIG. 1 is simplified block diagram of a restaurant service system in accordance with this disclosure.
Figure 15:
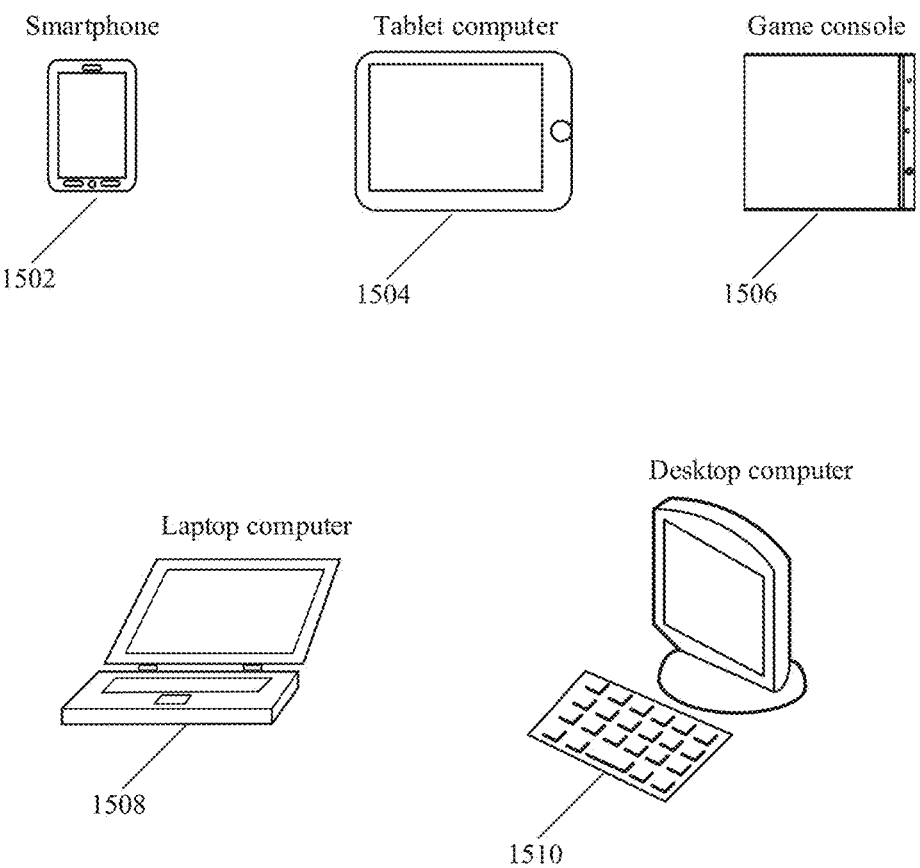
FIG. 15 is a perspective view of communication devices in accordance with the teachings of this disclosure.

Turning to the Figures and to FIG. 1 in particular, a restaurant service system 100 for providing a restaurant service is illustrated. The illustrative system 100 provides for real-time or near real-time information exchange between two restaurants 114,144 participating in the restaurant service and a diner 120. The system 100 includes a restaurant server 102 running a restaurant server software application, a diner server 106 running a diner server software application, a database 104 operatively coupled to the restaurant server 102 and the diner server 106, a wide area network 132 (such as the Internet), restaurant service devices 112,142 for the respective restaurants 114,144, two printers 116,146 connected to the respective restaurant service devices 112,142 over a wired or wireless link, and two diner devices 122,124. The diner devices 122,124 can be any communication devices with Internet access, such as any of the communication devices pictured in FIG. 15.

As depicted, a diner 120 accesses the restaurant service system 100 using the diner device 122 (such as a laptop or desktop computer) or the diner device 124 (such as a smartphone or a tablet computer). The diner devices 122,124 connect to the Internet 132 over a wired link (such as an Ethernet connection) or a wireless link (such as a WiFi connection). Alternatively, the diner device 124 connects to the Internet 132 via a public phone network, such as a public cellular network 134.

The diner server 106 interfaces with the diner devices 122,124 using the Internet 132 or another wide area network, and, in response to the diner's 120 inputs, creates, modifies, or cancels food orders, which can be individual orders or group orders. In one implementation, the orders are stored in database 104. The database 104 can be, for example, a relational database, such as an Oracle database or a Microsoft SQL database. In one implementation, the database 104 is a distributed database hosted in different geographical locations. The restaurant server 102, which is coupled to the Internet 132 or another wide area network, interfaces with the restaurant service device 112. The restaurant server 102 retrieves a new or an updated order from the database 104, and sends the order to the restaurant service device 112. For example, the restaurant server 102 runs a background process that monitors for new orders.

The restaurant service device 112 then provides updates, such as statuses of the order, to the restaurant server 102. The restaurant server 102 further stores the order statuses into the database 104. The order statuses are also communicated to the diner device 122 or 124 by the diner server 106. For example, the diner server 106 implements a web site hosting a web page that, when requested by the diner device 122 or 124, retrieves information about an order from the database 104 and displays the order information. Alternatively, the diner server 106 provides order information (such as a new status) to the diner device 122 or 124 by sending an Email message, a text message, a push notification, etc. In a different embodiment, the functions of the restaurant server 102 and the diner server 106 are performed on a same device, or performed by a same server application running on one or more physical servers.

The restaurant service device 112 can be, for example, a mobile device (such as a smartphone, a tablet computer, or a laptop computer) or a wired communication device (such as a desktop computer connecting to the Internet over an Ethernet link). In one implementation, the restaurant service device 112 is a mobile device including a touchscreen, a processor, a display, a wireless network interface, some amount of memory, and a storage device. The diner server 106 and the restaurant server 102 each include a processor, a network interface, and some amount of memory. The restaurant server software application and the diner server software application implement the functions and features of the restaurant server 102 and the diner server 106 respectively. In one implementation, the restaurant server software application and the diner server software application are programmed using computer programming language C# or Java. Additionally, in one implementation, the diner server 106 and the restaurant server 102 communicate with each other and access the database 104 over a private network.

To place an order, the diner 120 uses, for example, the diner device 122, to visit web pages hosted by the diner server 106. In one implementation, the web pages are part of the diner server software application. For example, the web pages are dynamically generated by the diner server software application, and function as the front end user interface of the diner server software application. The web pages allow the diner 120 to search for and select a restaurant and its menu items to build an order. Furthermore, the diner 120 enters contact information, delivery address, delivery instructions, order instruction, suborder instruction, suborder item instruction, and other information about the order when he builds his order. Some of such information can be retrieved from the database 104 if the diner 120 has entered such information before. Additionally, the web pages allow the diner 120 to place the built order, which can be an individual order or a group order. The selected restaurant is thus the serving restaurant for the built order.

When the order is placed, the diner server software application receives the order, and stores the order into the database 104. The restaurant server software application then retrieves the order from the database 104 and sends the order to the mobile service device 112 of the serving restaurant 114. In a further implementation, the diner server software application directly communicates the order to the restaurant server software application, which receives the order and sends it to the mobile service device 112.

Figure 2:
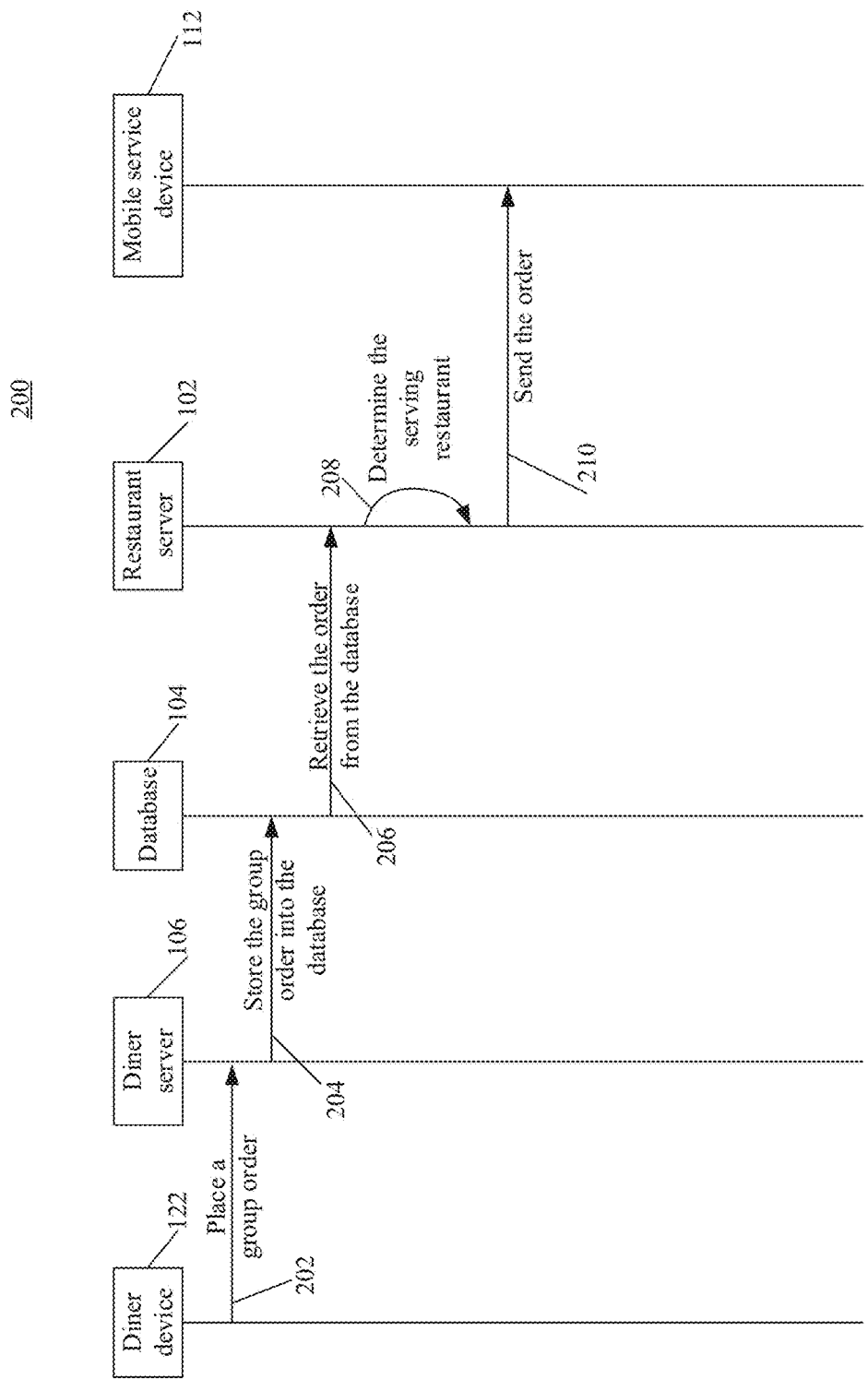
FIG. 2 is a sequence diagram depicting a process by which an order is placed and sent to a restaurant in accordance with the teachings of this disclosure.

The above ordering process is further illustrated by reference to FIG. 2. Turning to FIG. 2, a sequence diagram depicting a process 200 by which the system 100 receives the order and sends the order to the restaurant 114 is shown. At 202, a software application running on the diner device 122, such as a web browser or a proprietary software application, sends a request to the diner server 106 to place an order after the diner 120 builds the order. At 204, the diner server software application receives the order placement request, and stores the order into the database 104. In one implementation, the order is built using a web page. In such a case, detailed information about the order is also sent to the diner server 106 at 202.

Additionally, at 204, the diner server software application records the current time as the order receive time. At 206, the restaurant server software application retrieves the order from the database 104, or receives the order directly from the diner server 106. At 208, the restaurant server software application determines the serving restaurant(s), such as the restaurant 114, of the order. At 210, the restaurant server software application sends the order to the mobile service device 112.

When the diner 120 places a group order, the group order and its suborders are all sent to the serving restaurant 114. It should be noted that the group order can be served by multiple restaurants. In such a case, the group order is sent to each serving restaurant of the group order. For example, the group order is sent to both the mobile services 112 and 142 when both of the restaurants 114,144 are serving restaurants of the group order. The restaurant 114 serves one subset of suborders of the group order while the restaurant 144 serves the other subset of suborders of the group order. A group order is further illustrated with a sample data structure by reference to FIG. 7.

Referring to FIG. 7, a group order 700 includes a group order ID (meaning identifier) 702 uniquely identifying the group order 700 within the system 100, an order category 704, an order contact 706 identifying a person (such as the diner 120), an order contact telephone number 708 of the order contact 706, an order contact Email address 710 of the order contact 706, a delivery instruction 712 for the order 700, a delivery address 714 for the order 700, an order description 716, a total price of ordered items 718, a sales tax 720 for the order 700, an additional tax 722 (if there is any), a delivery fee 724, an additional delivery fee 726 (if there is any), a gratuity (i.e., tip) amount 728, an order total price 730, an order receive time 732 indicating the time and date when the order 700 is closed. After the group order 700 is initiated, it is opened for diners to place their individual orders during the open period set for the group order 700. At end of the open period, the group order 700 is closed. No new suborders can be added under the group order 700. When and after the group order 700 is closed, it is said that the group order 700 is placed with the restaurant service system 100.

The group order 700 further includes an order confirmation time 734 indicating the time and date when the restaurant 114 confirms the order 700, an order out-for-delivery time (or ready for pickup) 736 indicating the time and date when the order 700 is marked as ready by the restaurant 114, an order delivered time 738 indicating the time and date when the order 700 is actually delivered at the delivery address 714, a count of suborders 740 within the group order 700, and a serving restaurant(s) ID 742 uniquely identifying the restaurant 114. When the group order 700 is served by multiple restaurants, IDs of other serving restaurants are included. It should be noted that the group order 700 can include additional fields, such as a restaurant paid discount and a restaurant service paid discount, in a further implementation in accordance with the present disclosure.

The order category 704 identifies the category in which the group order 700 belongs. For example, the order category 704 is Complete indicating orders that have been served and completed, Now indicating orders that are being served or will be served shortly, or Later indicating orders that will be served in the future. In one implementation, Now status indicates orders that are being served or will be served during the current day, while Later orders are orders that will be served on the next calendar day or later relative the current day. As used herein, serving an order includes preparing the order in the kitchen of the restaurant 114. For a delivery order, serving the order also includes delivering the order to the delivery address of the order. For a pick-up order, serving the order also includes presenting the order to the person who picks up the order at the serving restaurant. For an eat-in order, serving the order includes presenting the ordered food items to the person or persons who eat inside the serving restaurant.

The order contact 706 can be a personal name, an entity name (such as a company or a company department), or both. The delivery instruction 712 includes one or more directives, such as "do not include plastic utensils and napkins," "extra sweet sour source," or "take food to conference room on 32$^{nd}$ floor." The order description 716 contains a description about the group order 700, such as "Wednesday Lunch." The total price of ordered items (also referred to herein as product total) 718 is the sum of the prices of ordered items in all suborders. The additional delivery fee 726 is applicable when, for example, weather is inclement or delivery time is late evening. The order total price 730 is the sum of the total price of ordered items 718, the sales tax 720, the additional tax 722, the delivery fee 724, the additional delivery fee 726 and the gratuity amount 728.

Figure 8:
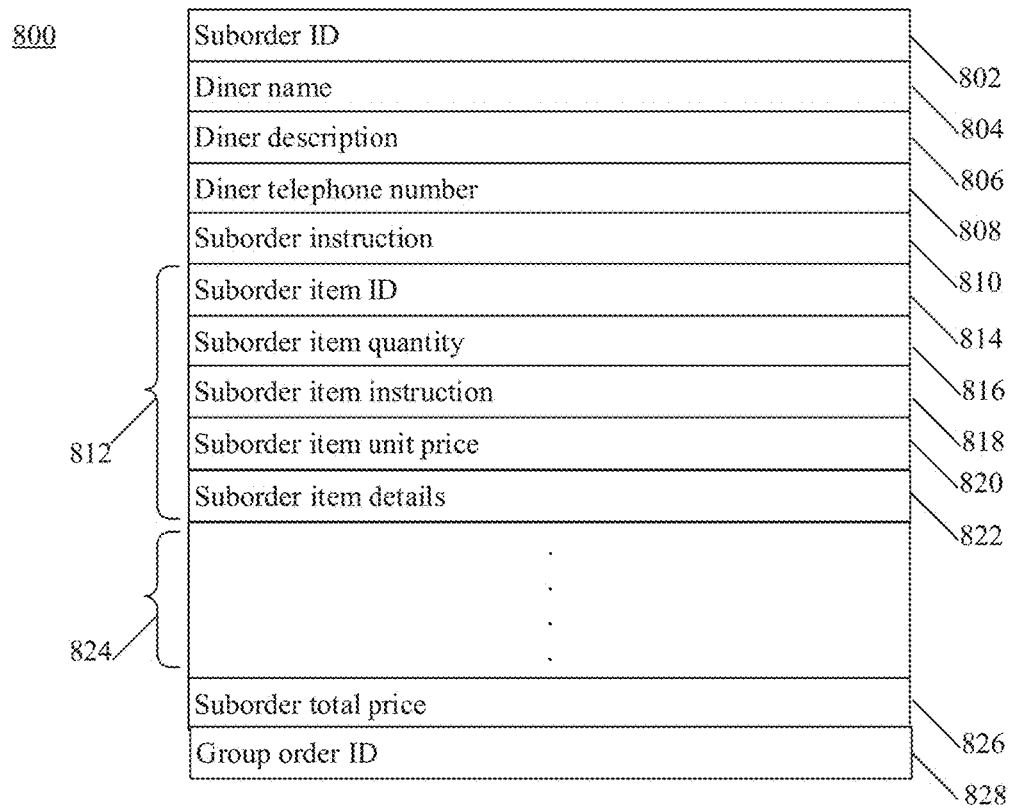
FIG. 8 is a table illustrating a sample suborder in accordance with the teachings of this disclosure.

The suborders of the group order 700 are illustrated by a sample structure 800 as shown in FIG. 8. The suborder 800 includes a suborder ID 802 identifying the suborder 800, a diner name 804 of the suborder 800, a diner description 806 describing the diner 804, a diner telephone number 808 of the diner 804, a suborder instruction 810, a suborder item 812, a suborder total price 826, and a group order ID 828. The suborder instruction 810 includes one or more directives, such as "no MSG." The suborder item 812 includes, for example, a suborder item ID 814 identifying a menu item of the serving restaurant 114, a suborder item quantity 816, a suborder item instruction 818, a suborder item unit price 820, and a suborder item details 822. The suborder item instruction 818 provides one or more directives, such as "please provide lemon wedges" or "no hot pepper," pertaining to the suborder item 812. The suborder item details 822 includes details and description of the suborder item 812.

The suborder 800 can include any number (such as three, ten, twenty, etc.) of additional suborder items 824. The suborder total price 826 is the sum of suborder item prices, each of which is a product of the suborder item quantity 816 and suborder item unit price 820. The group order ID 828 associates the suborder 800 with the group order 700 when the group order ID 828 is same as the group order ID 702. In a further implementation, the suborder item 812 is built by the diner 120. For example, the suborder item 814 is a Build Your Own Salad Bowl. In such a case, the suborder item 812 includes a number of selected food items, such as carrot, crouton, onion, pickle, green pepper, etc. Each food item can be associated with a food item unit price.

Figure 3:
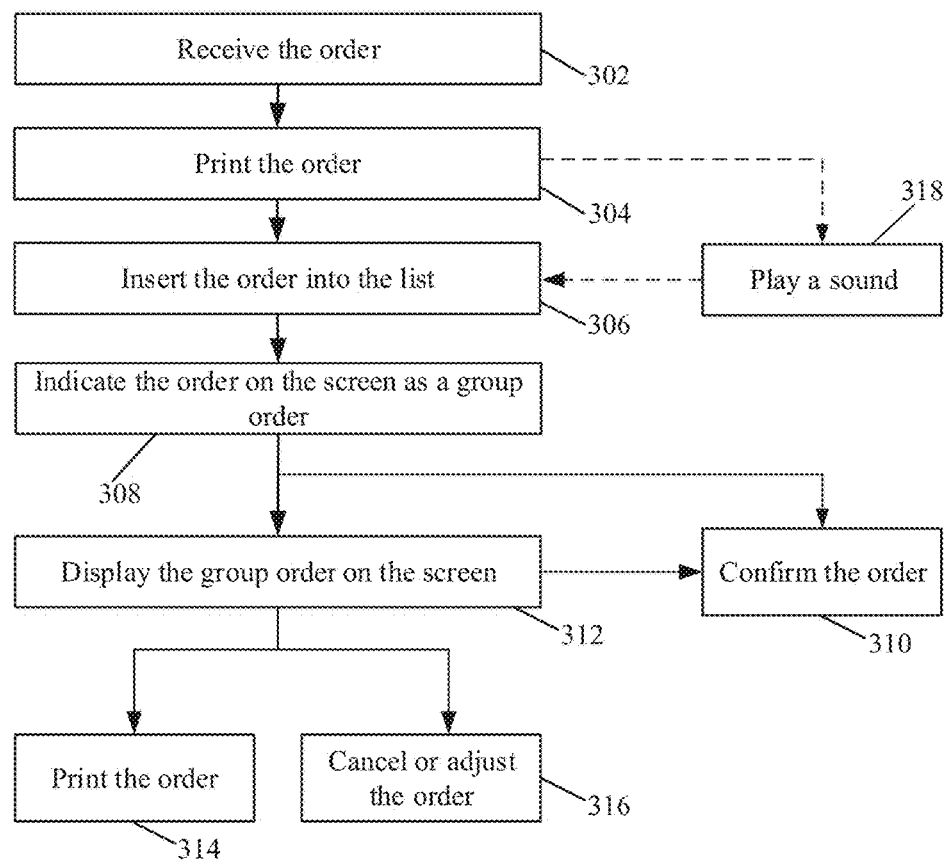
FIG. 3 is a flowchart that depicts a process by which a mobile service device manages a group order in accordance with the teachings of this disclosure.

After the mobile service device 112 receives the group order from the restaurant server 102, a mobile software application running on the mobile service device 112 processes the order by performing a process 300 as illustrated by reference to FIG. 3. The mobile software application is adapted to run on the, for example, Android or iOS, operating system. Alternatively, the mobile software application is a web browser that allows a staff member of the restaurant 114 to access the system 100. Referring now to FIG. 3, at 302, the mobile software application receives the order over a wireless network interface of the device 112 from the restaurant server 102. When the mobile software application is configured to print new order upon reception of the new order, at 304, the mobile software application prints the order using the networked printer 116 or a different networked printer. The mobile software application further provides a printer configuration screen to allow the restaurant 114 to select a default printer (identified by a name or IP address) for the mobile service device 112. The device 112 sends a print job to the printer 116 over a wireless connection. For example, the printer 116 is wired to a local area network; and the device 112 connects to the local area network using a WiFi link.

In a further implementation, when the mobile software application receives an order from the restaurant server 102, it plays a sound at 318. Whether to play a sound when an order is received is configurable. In one implementation, playing a sound when an order is received is the default setting. When a staff member configures the mobile software application to play a pre-recorded sound when a new order is received, the mobile software application always plays a sound when it receives an order. Otherwise, the mobile software application does not play any sound when it receives an order. Additionally, the pre-recorded sound is played whenever there is one or more unconfirmed orders.

In a further implementation, the staff member configures the mobile software application to play a sound only when a group order is received. Additionally, different sounds can be configured to be played for group orders and individual orders. In a further implementation, each sound is configured to be played a predetermined frequency.

At 306, the mobile software application inserts the group order into a Now order list, a list of orders in the Now category. In one implementation, the group order is inserted into the Now order list after the group order is confirmed. Similarly, if the order category of the group order is Later, the group order is then inserted into a Later order list. At 308, the mobile software application indicates the order as a group order on the screen of the mobile service device 112. A sample screen 500 illustrating the indicia of the group order is shown in FIG. 5.

Figure 5:
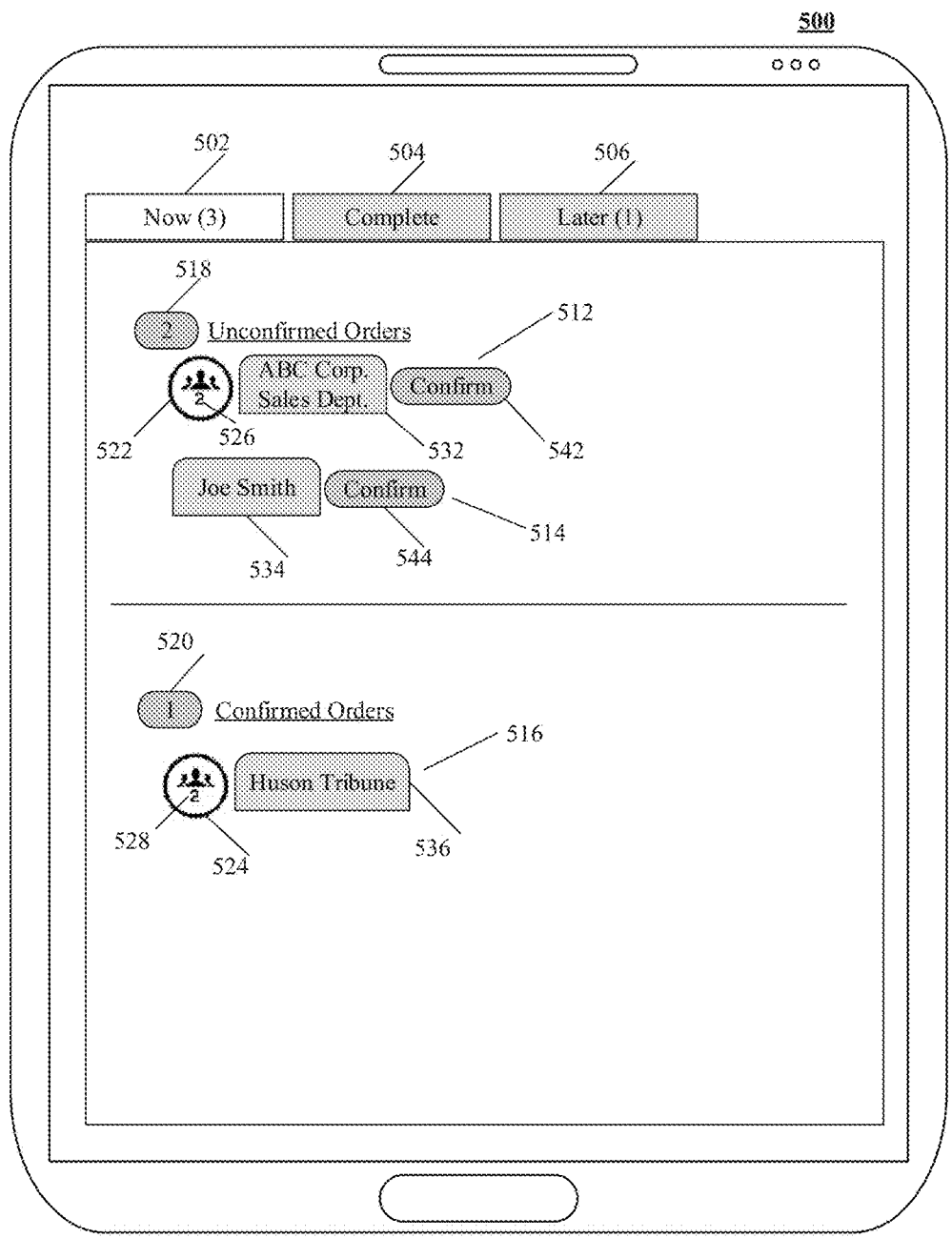
FIG. 5 is a sample screenshot illustrating group orders within a restaurant service system in accordance with the teachings of this disclosure.

Turning now to FIG. 5, the sample screenshot 500 includes a Now orders tab 502, a Complete orders tab 504 and a Later orders tab 506. In one implementation, the Complete orders tab 504 is available only when order tracking is enabled for the restaurant. The title of each tab further indicates the number of orders within the corresponding order category. The illustrative screen 500 indicates that there are three (3) Now orders, Complete orders and one (1) Later order. A click or press (on the touchscreen) on any of the three tabs causes the mobile software application to displays information about orders in the corresponding category. For example, when the tab 502 is clicked or pressed, three Now orders are indicated at 512, 514, 516. As used herein, the click and press on the touchscreen are referred to as user inputs. The orders 512 and 514 are unconfirmed orders, while the order 516 is a confirmed order. An order is confirmed if its serving restaurant accepts the order and agrees to serve the order.

In one implementation, the mobile software application maintains or tracks the Now, Complete and Later orders. Alternatively, the mobile software application requests the different categories of orders from the restaurant server software application when the diner 120 clicks or presses the buttons. The requests sent from the mobile software application conform to the interface(s) that the restaurant server software application provides. The interfaces can be, for example, HTTP (Hypertext Transfer Protocol), HTTPS (Hypertext Transfer Protocol Secure), and web service interfaces.

The number of unconfirmed orders and confirmed orders are indicated at 518 and 520 respectively. The orders 512, 514,516 include three respective order descriptions 532,534, 536, such as diner names or business entities. Both the order 512 and 516 are group orders as indicated by group order indicators 522,524. Each of the group order indicators 522,524 further illustrates the number of suborders or diners of the corresponding group order. For example, the group order 512 contains two (2) suborders for two diners. Any number of suborders can be included within a group order. The numbers of suborders are indicated at 526 and 528 respectively. A graphical indicator 672 indicates that the group order 602 is a group order for delivery. Alternatively, when the group order 602 is a pickup order (meaning that it is picked up from the serving restaurant), a different graphical indicator is used to indicate that the group order 602 is a pickup order.

The orders 512,514 are also illustrated with two respective software buttons 542,544 for the staff member of the restaurant 114 to confirm the orders. Clicking or pressing the button 542 or 544 causes the mobile software application to send a request or message to the restaurant server 102 indicating that the restaurant 114 has confirmed the corresponding order. In response, the restaurant server software application updates the status of the order to a confirmed status in the database 104. In a further implementation, the diner server software application sends a notification, such as an Email, text message or push notification, to the diner device 122 or 124, indicating to the diner 120 that his order has been confirmed. Alternatively, the staff member clicks or presses the order description links 532 or 534 to open and display the corresponding order.

Figure 6A:
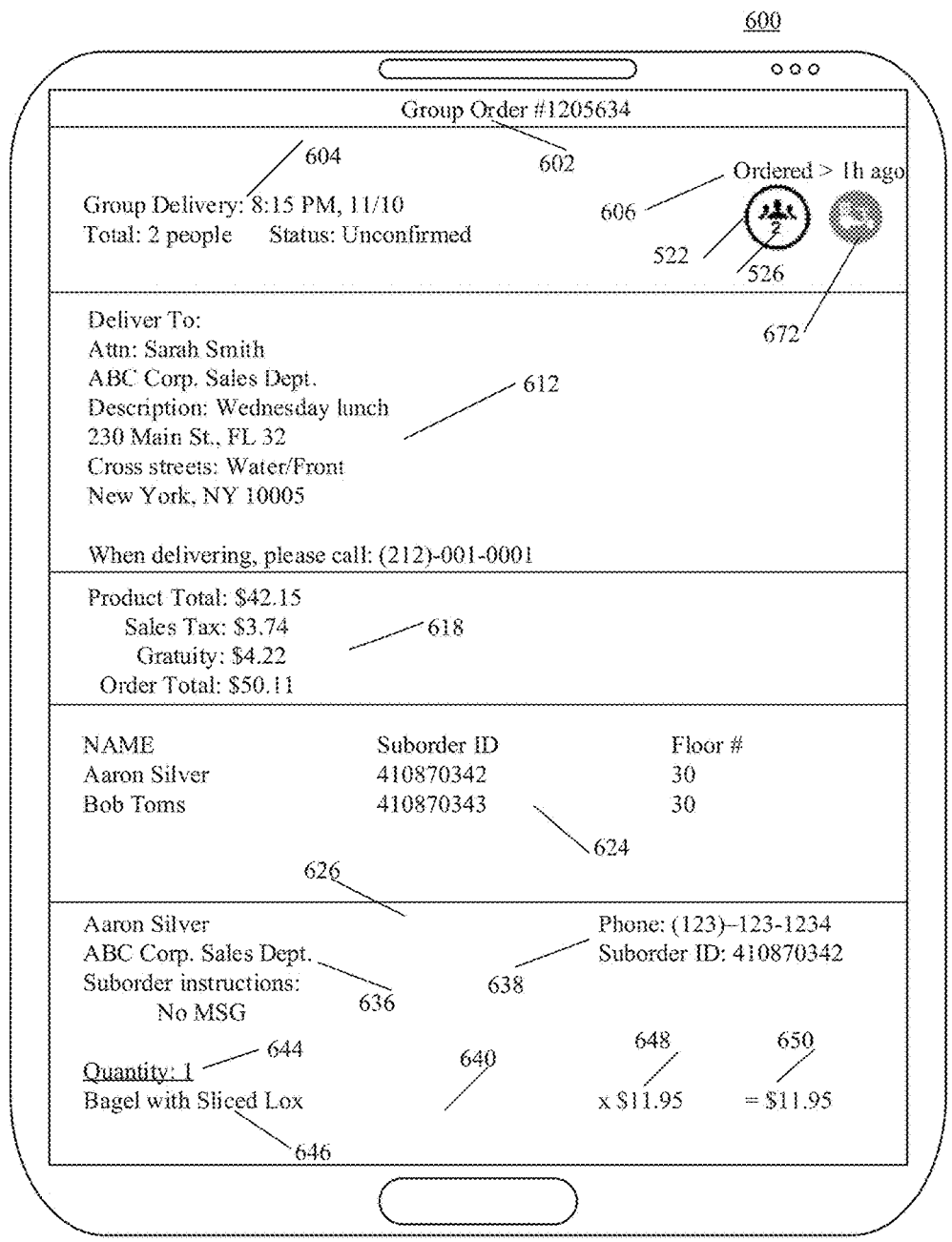
FIG. 6A is a sample screenshot displaying a group order within a restaurant service system in accordance with the teachings of this disclosure.
Figure 6B:
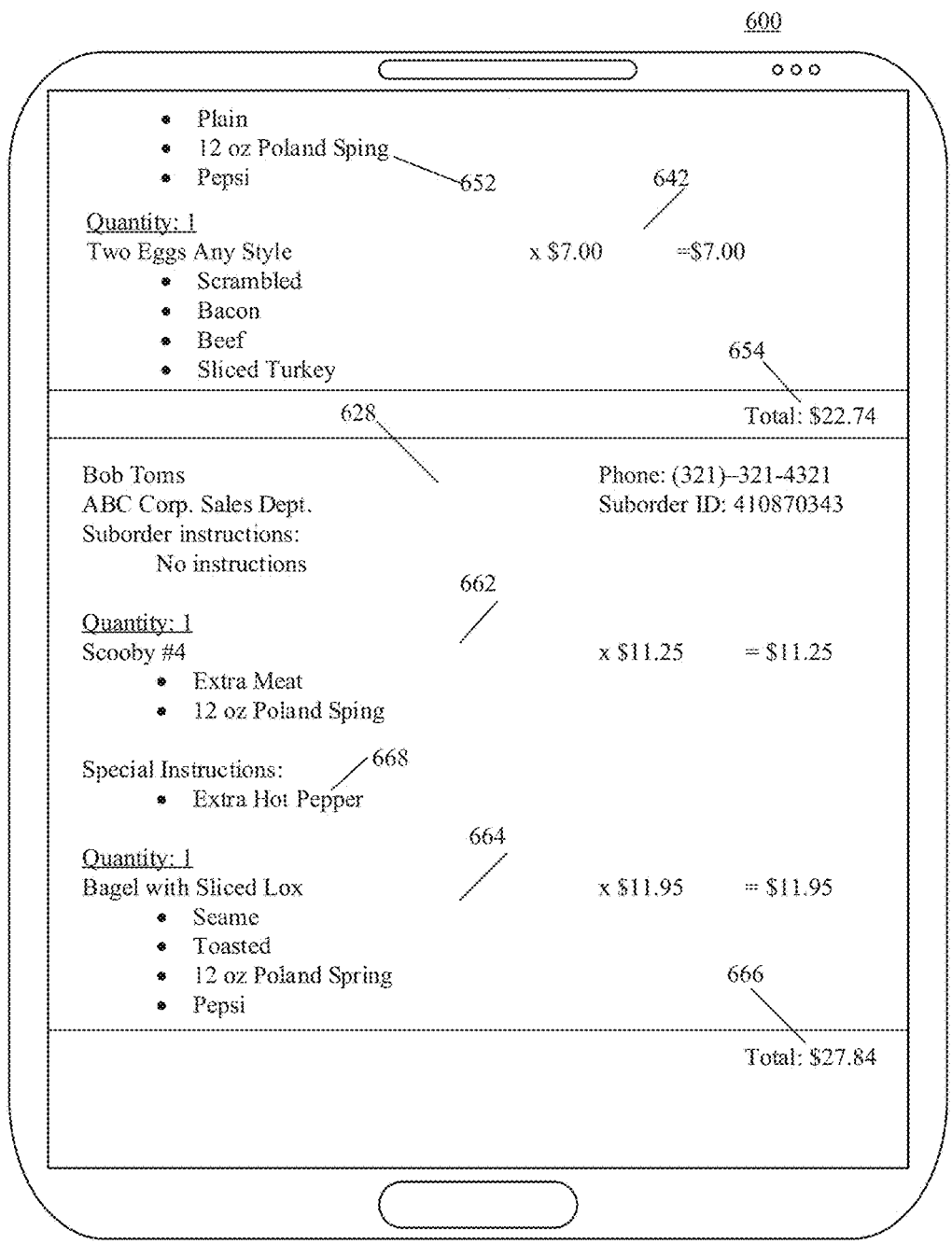
FIG. 6B is a sample screenshot displaying a group order within a restaurant service system in accordance with the teachings of this disclosure.
Figure 6C:
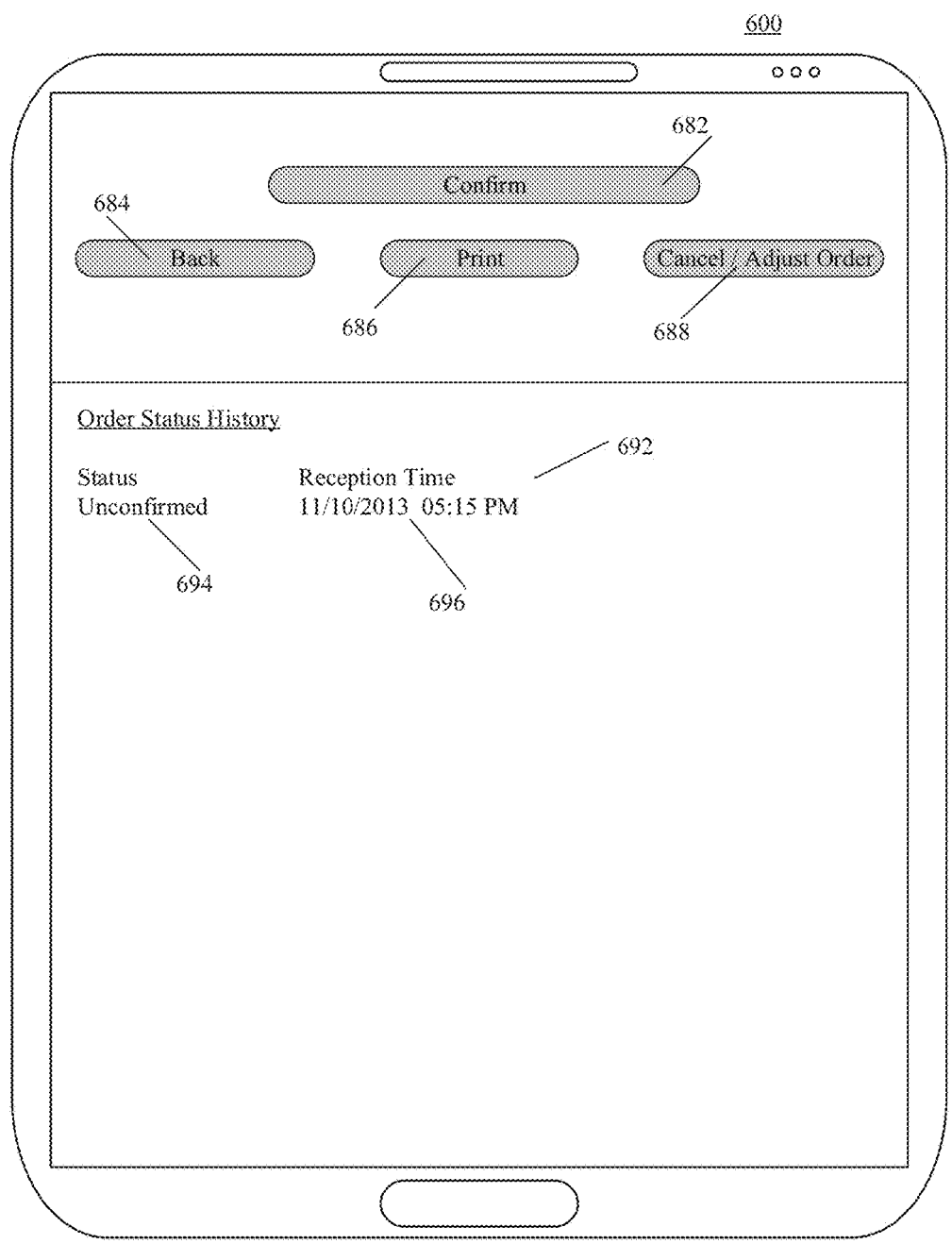
FIG. 6C is a sample screenshot displaying a group order within a restaurant service system in accordance with the teachings of this disclosure.

Turning back to FIG. 3, when the staff member clicks or presses the button 542, at 310, the mobile software application confirms the group order 512. When the staff member clicks or presses the order description link 532, at 312, the mobile software application displays the group order. A sample screen displaying the group order is shown and generally indicated at 600 in FIGS. 6A,6B,6C. Each of the FIGS. 6A,6B,6C illustrates part of the group order. Referring now to FIGS. 6A,6B, 6C, the screen 600 includes a title 602 showing the group order ID and order type as a group order. The screen 600 also shows the expected delivery time of the group order, number of people (i.e., number of suborders) for the group order and the order status (i.e., unconfirmed) at 604. Element 604 is thus a group order indicator showing that the order is a group order and the number of suborders within the group order.

The screen 600 further includes the graphical group order indicator 522 and suborder count 526. The screen 600 also includes an ordering time indicator 606 showing how long ago the group order was placed. Additionally, the screen 600 includes a group order delivery information section 612 that shows, for example, the order contact, the order description, the delivery address, the contact telephone number, and other information of the group order. The screen 600 displays the price information of the group order at 618. Additionally, the screen 600 displays the names of diners, IDs and location information of the suborders of the group order at 624. In this illustration, there are two suborders in the group order, which are displayed at 626,628. The name of the diner and suborder instruction of the suborder 626 is displayed at 636; and the diner telephone number and the suborder ID of the suborder 626 is displayed at 638.

The suborder 626 includes two suborder items 640,642. The suborder item quantity, suborder item ID, suborder item unit price, suborder item total price, and suborder item details of the suborder item 640 are displayed at 644, 646, 648, 650, 652 respectively. The total price (including gratuity and tax) of the suborder 640 is displayed at 654. The suborder 628 includes two suborder items 662,664 as well, though more suborder items can be included in the suborder 628. The total price (including gratuity and tax) of the suborder 628 is displayed at 666. The suborder item 662 includes a suborder item instruction 668. The sum of the suborder total prices is the product total as shown at 618.

The screen 600 further includes a set of software buttons 682,684,686,688. In response to the click or press on the button 682, the mobile software application sends a request to the restaurant server 102 to confirm the group order. Upon successful confirmation of the group order, the status of the group order is changed from an unconfirmed status to a confirmed status. The button 684 allows the staff member to go back to a previous screen. The button 686 allows the staff member to print the group order using the printer 116. The button 688 allows the staff member to cancel the group order. In such a case, the mobile software application sends a request to the restaurant server software application. The request identifies the group order and the type of the request (i.e., cancellation).

The button 688 or a separate button further allows the restaurant 114 to adjust the group order. For example, when the restaurant 114 runs out an ingredient for one suborder item, it may replace that ingredient with a similar ingredient. In such a case, the restaurant 114 may further apply a discount on the price or provide a credit. In one implementation, an adjustment request is sent to a customer care team to make the adjustment. The screen 600 further includes an order status history 692. In the order status history section 692, the status of the group order is shown at 694; and the reception time of the order is shown at 696. Turning back to FIG. 3, the mobile software application performs elements 310, 314 and 316 when the buttons 682,686 and 688 are clicked or pressed respectively.

Sometimes, a group or individual order is not quickly confirmed or served for various reasons. For example, the staff members of the restaurant 114 accidently overlook an order, or are extremely busy on a certain day. Accordingly, a color aging feature for reminding the staff members of late response to a group order provides a solution to the problem. In one implementation, within a predetermined amount of time (such as two minutes) from the reception of the group order, the group order indicator 522 is displayed in, for example, gray or yellow color if the group order is not confirmed yet. However, if the group order has not been confirmed for more than a predetermined amount of time (such as two minutes), the group order indicator 522 is then displayed in a different color, such as red color. In a further implementation, when the group order is not confirmed after the predetermined amount of time, a restaurant service customer care professional places a telephone call to the serving restaurant regarding the unconfirmed group order.

Figure 4:
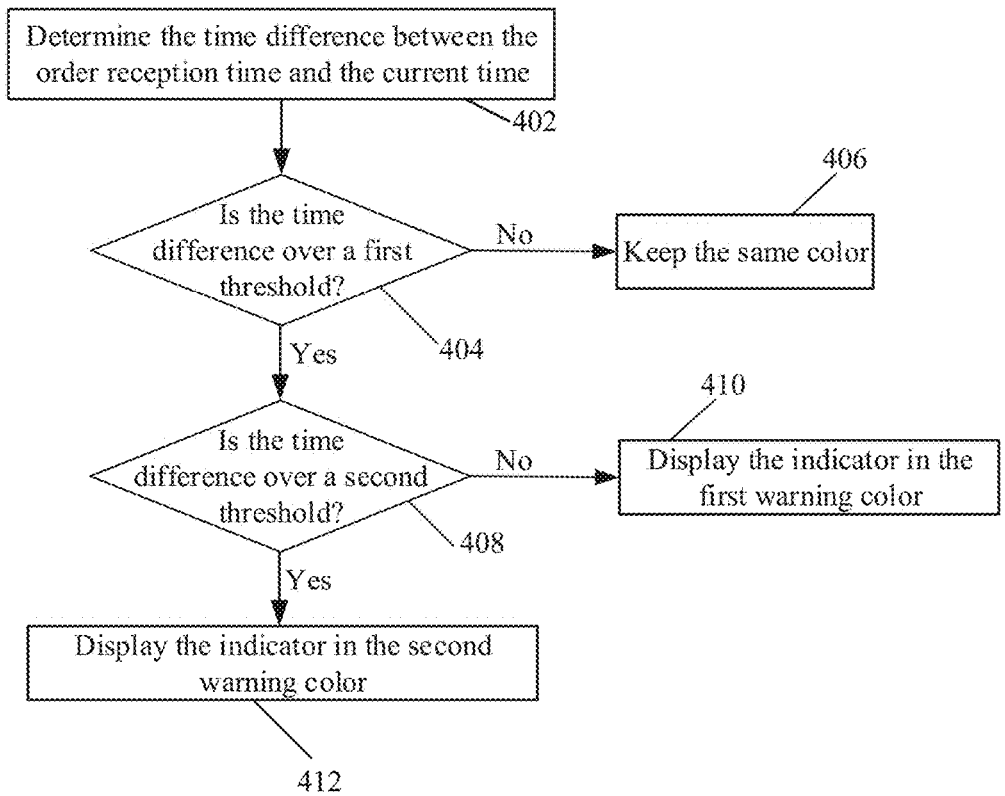
FIG. 4 is a flowchart that depicts a process by which a mobile service device reminds a restaurant of unconfirmed order in accordance with the teachings of this disclosure.

The color aging feature is further illustrated by reference to FIG. 4. Referring not to FIG. 4, a color aging process 400 by which the mobile software application reminds the restaurant 114 of unconfirmed orders is shown. At 402, the mobile software application determines the time difference between the reception time of the group order (or any other order) and the current time. At 404, the mobile software application checks whether the time difference is over a first threshold (such as fifteen minutes). If not, at 406, the mobile software application keeps the current color (such as black or green) of the group order indicator 522. Otherwise, at 408, the mobile software application checks whether the time difference is over a second threshold (such as thirty minutes) that is bigger than the first threshold. If not, at 410, the mobile software application displays the group order indicator 522 in a first warning color, such as yellow color. Otherwise, at 412, the mobile software application displays the group order indicator 522 in a second warning color, such as red color. It should be noted that elements 408,410 are not needed when only two different colors are used.

Alternate embodiments may use different thresholds, different number of threshold, and/or different warning colors. Moreover, the color aging feature can be replaced by or combined with an audio reminding mechanism. For example, when the time difference is over the first threshold, a first pre-recorded sound is played. In a further implementation, the warning colors flash. For example, when the waning color is red color, the group order indicator 522 is continuously and alternatively displayed in red color for a predetermined amount of time (such as one second) and a different color (such as black or white) for another predetermined amount of time (such as one second) until the group order 700 is confirmed.

In a further implementation in accordance with the present teachings, the restaurant service system 100 manages catering orders. As a special type of group order, a catering order generally feeds a group of people. The restaurant service system 100 performs methods 200, 300 and 400 as well to manage catering orders. A catering order can be delivered to the diner's address or picked up from the serving restaurant. Additionally, a catering order can be a future order that will be served in the future (such as one day from the current date and time) or an as-soon-as-possible ("ASAP") order. Restaurants (such as the restaurants 114, 144) may stipulate additional details about catering orders on their respective menus. For example, the restaurant 114 describes policies, order cut-off times, minimum lead time (such as three, six or twenty four hours prior to delivery or pickup), and other details concerning catering orders on its menu. The cut-off time prevents diners from placing catering orders after the designated cut-off time (such as 4:00 PM).

The lead time requires diners to place catering orders a certain amount of time before the serving time of the catering order. Otherwise, a caterer (such as a staff member from the restaurants 114,144) may not be able to process the catering orders within a requested timeframe. Catering orders are oftentimes placed for corporate events. The system 100 allows corporate clients to specify a host, a secondary contact, setup instructions and notes to the caterer for each catering order. Each catering order is also stored in the database 104. A sample logical representation of a catering order is illustrated by reference to FIG. 9.

Figure 10:
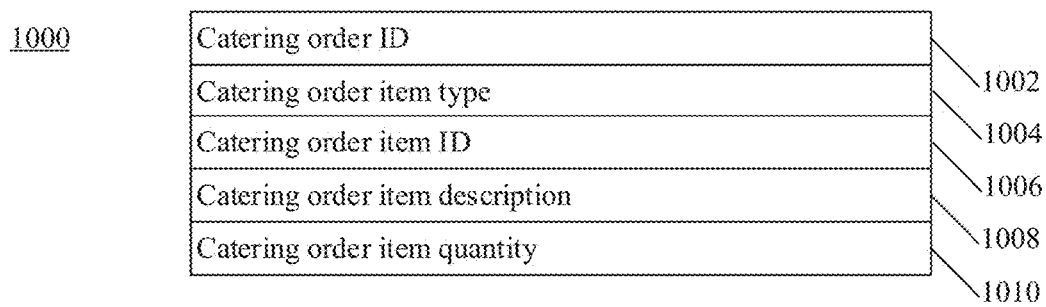
FIG. 10 is a table illustrating a sample catering order item in accordance with the teachings of this disclosure.

Each catering order includes a set of catering order items, such as platters, regular menu items, customized items for particular clients or diners, and special items like tableware and utensils. A sample logical representation of a catering order item is illustrated by reference to FIG. 10. Referring to FIG. 10, a catering order item table 1000 includes a catering order ID 1002 linking the item 1000 to the catering order 900 of FIG. 9, a catering order item type (such as a platter, a customized item or a regular menu item) 1004, a catering order item ID 1006, a catering order item description 1008, and a catering order item quantity 1010. In one implementation, when the catering order item type is a regular menu item (such as the menu item 664), the catering order item ID 1006 is the corresponding menu item ID. The catering order item quantity 1010 specifies the number of the catering order item 1000 in the catering order 900. It should be noted that a commercial embodiment of the catering order item 1000 may include additional fields.

A catering order can be placed by the diner 120 using the diner device 124 or 122. The catering order is then sent to the diner server 106, which stores the catering order into the database 104. The restaurant server 102 (or the diner server 106) retrieves the catering order from the database 104 before sending it to the restaurant service device 112. The device 112 then indicates the catering order on the screen of the device 112 to allow the restaurant 114 to confirm and prepare the catering order. Sample screenshots of the restaurant service device 112 for managing catering orders are further illustrated by reference to FIGS. 11,12,13.

Figure 11:
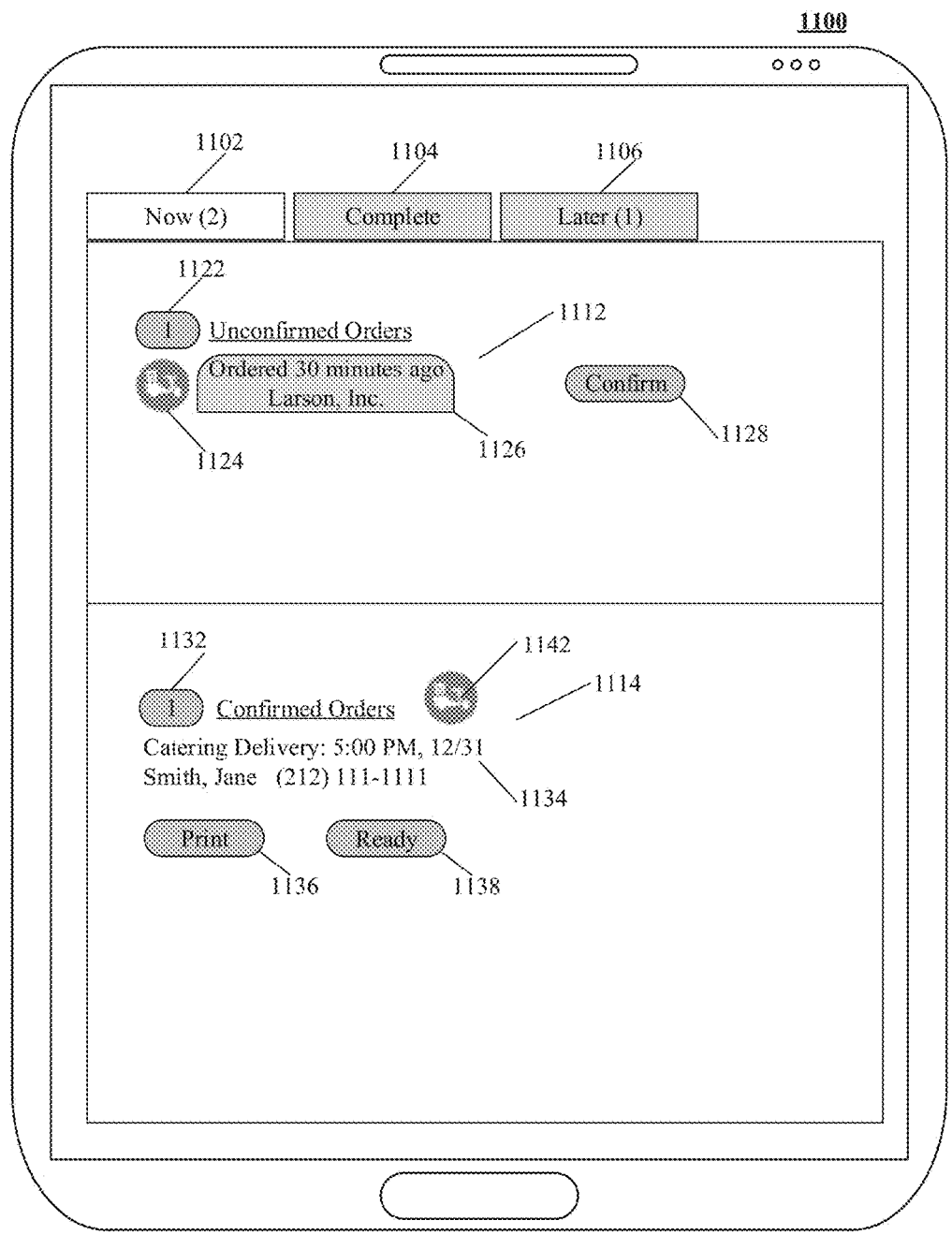
FIG. 11 is a sample screenshot illustrating catering orders within a restaurant service system in accordance with the teachings of this disclosure.

Turning first to FIG. 11, a sample screenshot illustrating two catering orders 1112,1114 is shown and generally indicated at 1100. Two Now catering orders 1112,1114 are indicated at 1102, while one Later catering order is indicated at 1106. The number of the unconfirmed catering order 1112 is indicated at 1122, while the number of the confirmed catering order 1114 is indicated at 1132. A graphical indicator 1124 indicates that the order 1112 is a delivering order. Additionally, a description 1126 displays additional details about the order 1112. A Confirm button 1128 allows the restaurant 114 to confirm the catering order 1112. Moreover, a delivery order icon 1142 indicates that the catering order 1132 is a delivery catering order (meaning that the catering order 1132 is delivered from the serving restaurants to a diner address). For a pickup catering order, a pickup order indicator will be displayed.

A description 1134 shows further details of the catering order 1114. A Print button 1136 allows the restaurant 114 to print the catering order 1114 using the printer 116. When the catering order 1114 is prepared and ready for pickup or delivery, a Ready button 1138 is then clicked. In response to the click of the Ready button 1138, the web browser or software application running on the device 112 sends the order status update to the restaurant server 102, which subsequently stores the status update into the database 104.

To confirm the catering order 1112, a staff member of the restaurant 114 clicks the Confirm button 1128. In response to the click, the software application running on the device 112 sends a request or notification to the restaurant server 102. The restaurant server software application subsequently updates the catering order 1112 in the database 104 with a confirmed order status. When the staff member clicks on the area designated by a chevron, an order detail screen showing the details of the catering order 1112 is then displayed on the screen of the device 112. A sample screenshot of the catering order 1112 is further illustrated by reference to FIG. 12.

Figure 12:
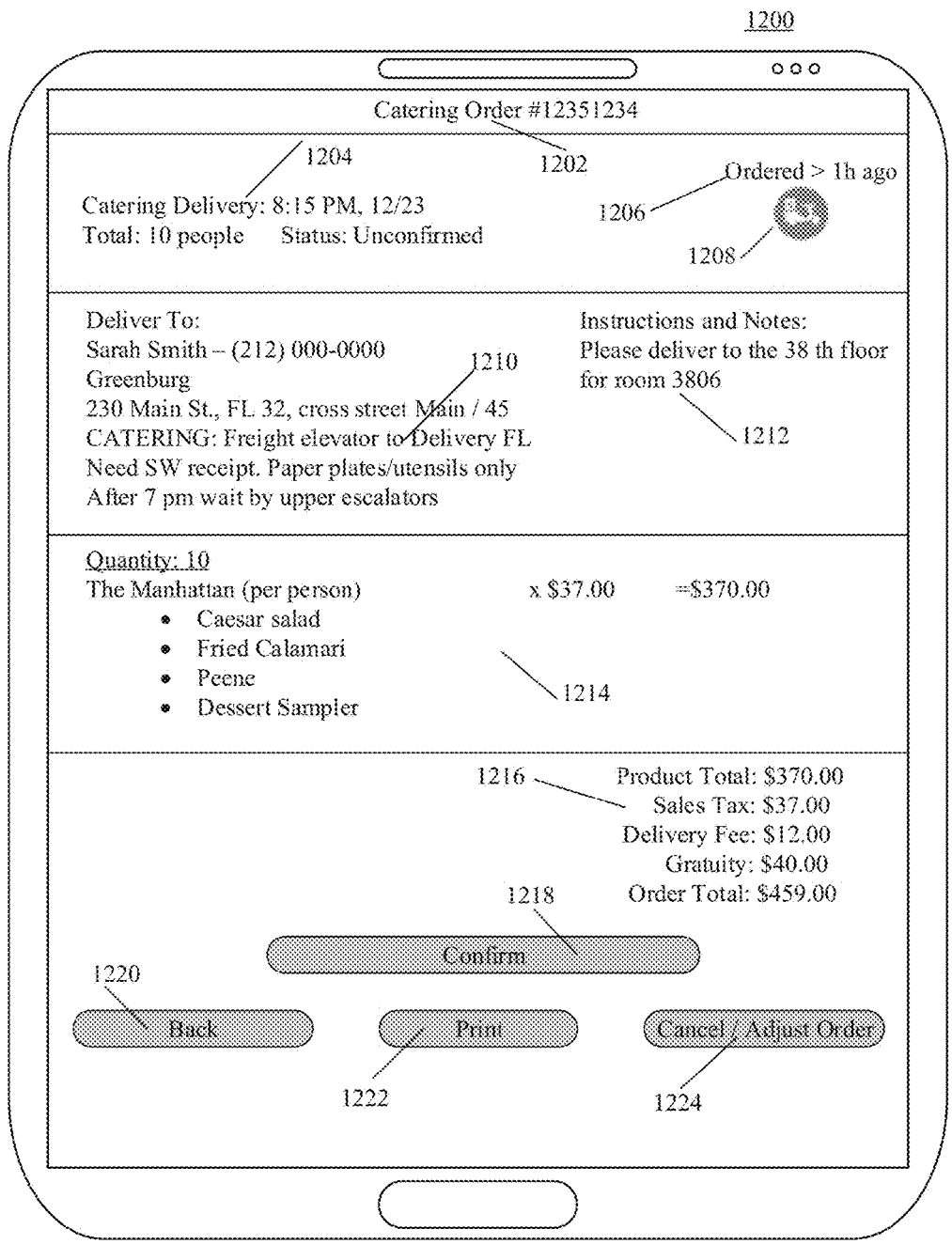
FIG. 12 is a sample screenshot displaying a catering order within a restaurant service system in accordance with the teachings of this disclosure.

Referring to FIG. 12, a sample screenshot 1200 of the catering order details includes a title 1202 indicating the catering order ID and a description 1204 indicating the catering order delivery time and status. The description 1204 indicates that the catering order (#12351234) serves ten (10) people and has not been confirmed yet. The screen 1200 further includes a description 1206 indicating the order time information, a delivery order indicator 1208, a delivery information summary 1210, an instruction and note 1212, a catering order item description 1214, a catering order price summary 1216, a Confirm button 1218, a Back button 1220, a Print button 1222, and a Cancel/Adjust Order button 1224. The catering order item description 1214 indicates that the catering order includes ten servings. Each serving includes a set of menu items. As used herein, a serving is also referred to as a catering order item. Clicking the Confirm button 1218 causes the software application running on the device 112 to send a request or notification to the restaurant server 102 for confirming the catering order 1112. The restaurant server software application then updates the catering order 1112 in the database 104 with a confirmed status.

Figure 13:
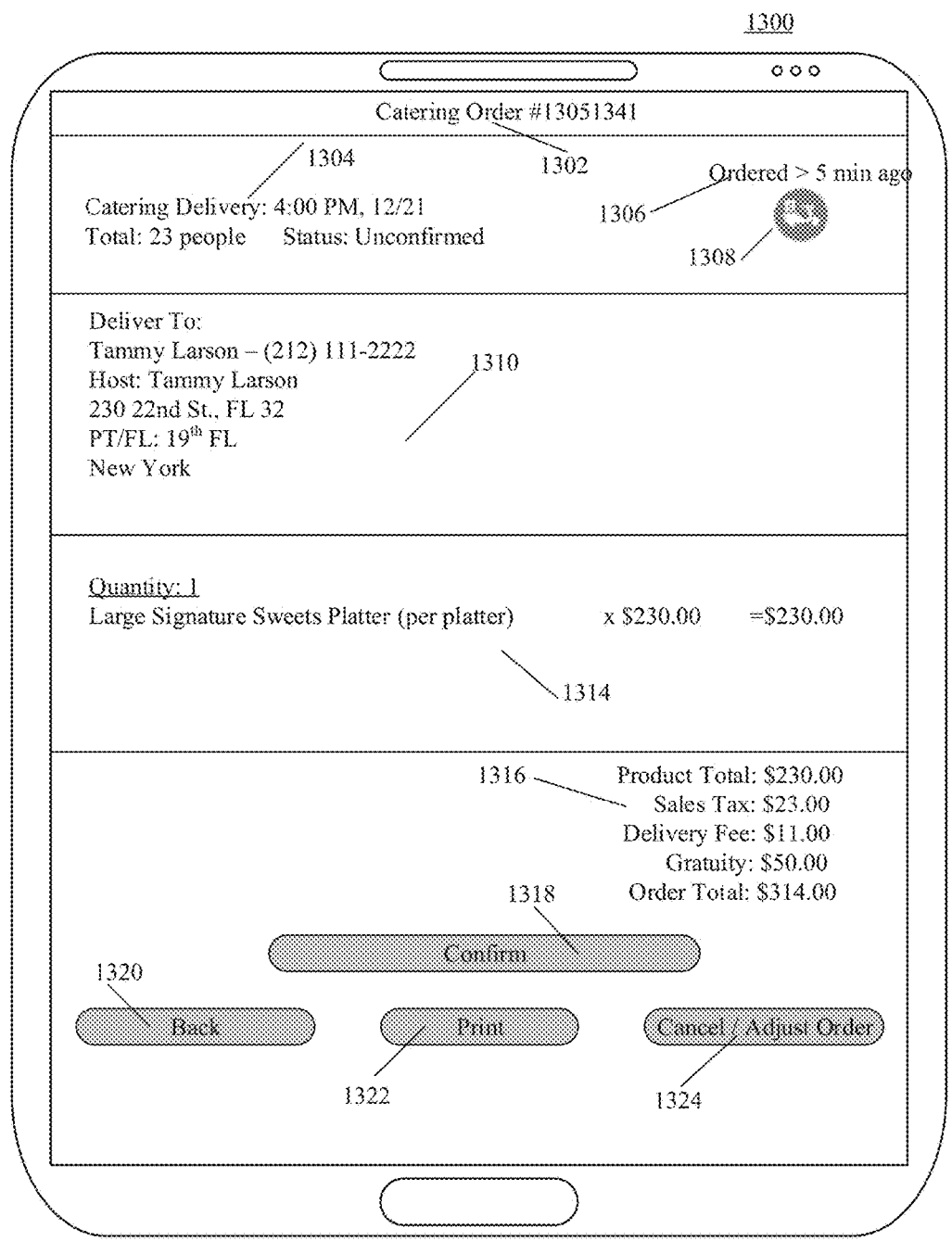
FIG. 13 is a sample screenshot displaying a catering order within a restaurant service system in accordance with the teachings of this disclosure.

Referring now to FIG. 13, a sample screenshot 1300 shows a catering order with a platter catering order item. The screenshot 1300 includes a title 1302, order details 1304, an order time detail 1306, a catering order indicator 1308, a delivery information summary 1310, order quantity and details 1314, a price summary 1316, a Confirm button 1318, a Back button 1320, a Print button 1322 and a Cancel/Adjust Order button 1324. The order details 1304 indicate that the catering order 1300 serves twenty three (23) people with an unconfirmed status. The quantity and details 1314 indicate that the catering order 1300 has a quantity of one (1). In other words, the catering order 1300 includes one catering order item. The catering order item is a platter that is prepared to serve twenty three people. The platter includes twenty three servings. A logical representation of the platter is stored in the database 104 in the form of database records. When the catering order 1300 is placed through the system 100, it is setup with the platter. Alternatively, catering orders can be setup with individual boxes, such as the plates 1214, each of which serves a single person.

Each catering order is associated with a set of allocations. The set of allocations indicates how the catering order is billed. Each allocation refers to an entity (a person or a commercial entity) or account charged for the catering order. In one implementation, the allocation information is maintained in the database 104, and not shown on the restaurant service devices 112,142. For example, where a company has a single account in the system 100, each catering order for the company is charged against the same account. In such a case, each catering order for the company has exactly one allocation. As an additional example, an office manager organizes a catering event for two different departments of her company. The office manager sets up the catering order with two allocations. In other words, the catering order is charged against two accounts of the respective departments.

Figure 14:
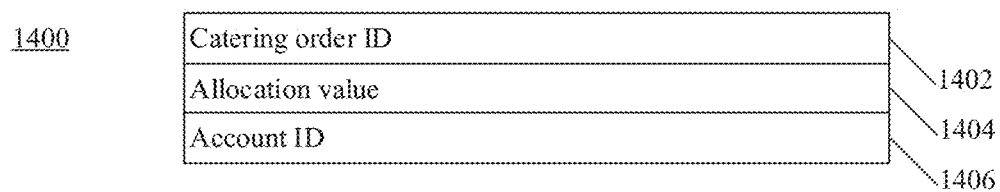
FIG. 14 is a table illustrating a sample catering order allocation in accordance with the teachings of this disclosure.

In one implementation, each allocation is represented by a database record stored in the database 104. A sample catering order allocation record is illustrated by reference to FIG. 14. Referring to FIG. 14, a table 1400 illustrating a sample catering order allocation is shown. The table 1400 includes a catering order ID 1402, an allocation value 1404, and an account ID for the allocation 1404. The allocation value 1404 can be a dollar amount or a percentage. Where a catering order includes more than one allocation, more than one database record 1400 is created in the database 104 to represent the multiple allocations.

Obviously, many additional modifications and variations of the present disclosure are possible in light of the above teachings. Thus, it is to be understood that, within the scope of the appended claims, the disclosure may be practiced otherwise than is specifically described above. For example, the mobile software application only prints certain details of a group order for food preparation by a chef. The selective printing is faster and increases readability of the printout for the chef. As an additional example, the functions of the mobile service device 112 are performed on a desktop computer running a web browser (such as Google Chrome) or a proprietary desktop software application. In such a case, the features of the FIGS. 5,6A,6B,6C,11,12,13 are implemented and displayed in the web browser or the proprietary desktop software application. As still a further example, the functions of the restaurant server 102 and the diner server 106 are performed by one server or one software application running on one or more servers.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A method for managing group orders, the method operating within a restaurant service system and comprising:
   i) receiving an unconfirmed group order from a diner device over a wide area network, wherein the unconfirmed group order is a group order that has yet to be acknowledged by one or more serving restaurants of the group order and that includes a plurality of suborders wherein each suborder includes a set of suborder items;
   ii) storing the unconfirmed group order into a database;
   iii) sending the unconfirmed group order to a restaurant service device of each restaurant within a set of restaurants over the Internet, wherein each restaurant within the set of restaurants is a serving restaurant for the unconfirmed group order;
   iv) the restaurant service device receiving the unconfirmed group order;
   v) the restaurant service device displaying the unconfirmed group order on a screen of the restaurant service device with a graphical icon indicating that the unconfirmed group order is a group order, wherein the graphical icon is displayed in a first color;
   vi) the restaurant service device constantly monitoring a time difference between an order receive time of the unconfirmed group order and a current time and detecting when the time difference exceeds a predetermined amount of time during which the unconfirmed group order remained unconfirmed;
   vii) in response to the detecting, the restaurant service device automatically displaying the graphical icon in a second color comprising warning information that is viewable on the screen by a user, wherein the warning information indicates that the unconfirmed group order remains unconfirmed.

2. The method of claim 1 wherein the graphical icon indicates the number of suborders in the unconfirmed group order.

3. The method of claim 1 further comprising automatically printing the unconfirmed group order using a printer, wherein the restaurant service device connects to the printer over a wireless network.

4. The method of claim 1 further comprising automatically playing a sound when the restaurant service device receives the unconfirmed group order over a wireless network.

5. The method of claim 1 further comprising, in response to a user input, changing the unconfirmed group order to a confirmed group order, printing the confirmed group order using a printer, canceling the unconfirmed group order or adjusting the unconfirmed group order.

6. The method of claim 1 further comprising indicating the unconfirmed group order in a list of unconfirmed group orders with a set of group order indicators, wherein the set of group order indicators includes a graphical group order indicator, wherein the graphical group order indicator indicates the number of the suborders within the unconfirmed group order.

7. The method of claim 6 further comprising:
   i) determining the time difference exceeds another predetermined amount of time during which the unconfirmed group order remained unconfirmed; and
   ii) in response to determining that the time difference exceeds the another predetermined amount of time, displaying the graphical icon in a third color.

8. The method of claim 1 wherein the set of restaurants includes exactly one restaurant.

9. A restaurant service system for managing group orders, the restaurant service system comprising:
   i) a first server including a first processor and a first network interface coupled to the first processor and adaptively coupled to a database;
   ii) a second server including a second processor and a second network interface coupled to the second processor and adaptively coupled to the database;
   iii) a diner device;
   iv) a mobile service device including a screen, a mobile device processor and a wireless network interface coupled to the mobile device processor;
   v) a first server software application operating on the first processor, wherein the first server software application is adapted to:
      1) receive an unconfirmed group order from the diner device over the first network interface, wherein the unconfirmed group order is a group order that has yet to be acknowledged by one or more serving restaurants of the group order and that includes a plurality of suborders wherein each suborder includes a set of suborder items; and
      2) store the unconfirmed group order into the database,
   vi) a second server software application operating on the second processor, wherein the second server software application is adapted to retrieve the unconfirmed group order from the database and send the unconfirmed group order to the mobile service device over the second network interface;
   vii) a mobile software application operating on the mobile device processor, wherein the mobile software application is adapted to:
      1) receive the unconfirmed group order over the wireless network interface;
      2) display the unconfirmed group order on the screen of the mobile service device with a graphical icon indicating that the unconfirmed group order is a group order, wherein the graphical icon is displayed in a first color;
      3) constantly monitor a time difference between an order receive time of the unconfirmed group order and a current time and detect when the time difference exceeds a predetermined amount of time during which the unconfirmed group order remained unconfirmed;
      4) in response to the detecting, automatically display the graphical icon in a second color comprising warning information that is viewable on the screen by a user, wherein the warning information indicates that the unconfirmed group order remains unconfirmed.

10. The restaurant service system of claim 9 wherein the graphical icon indicates the number of suborders in the unconfirmed group order.

11. The restaurant service system of claim 9 further comprising a printer wherein the mobile software application is further adapted to automatically send the unconfirmed group order over a wireless connection to the printer to print out the unconfirmed group order.

12. The restaurant service system of claim 9 wherein the mobile software application is further adapted to automatically play a sound after the mobile software application receives the unconfirmed group order over the wireless network interface.

13. The restaurant service system of claim 9 wherein the mobile software application is further adapted to, in response to a user input, change the unconfirmed group order to a confirmed group order, print the confirmed group order using a printer within the restaurant service system, cancel the unconfirmed group order or adjust the unconfirmed group order.

14. The restaurant service system of claim 9 wherein the mobile software application is further adapted to indicate the unconfirmed group order in a list of unconfirmed orders with a set of group order indicators, wherein the set of group order indicators includes a graphical group order indicator, wherein the graphical group order indicator indicates the number of the suborders within the unconfirmed group order.

15. The restaurant service system of claim 14 wherein the mobile software application is further adapted to:
  i) determine the time difference exceeds another predetermined amount of time during which the unconfirmed group order remained unconfirmed; and
  ii) in response to determining that the time difference exceeds the another predetermined amount of time, display the graphical icon in a third color.

16. The restaurant service system of claim 9 wherein the first server software application and the second server software application are a same server software application.

17. The restaurant service system of claim 9 wherein the functions of the first server and the functions of the second server are performed on a same server device.

18. A restaurant service system for managing catering orders, the restaurant service system comprising:
  i) a first server including a first processor and a first network interface coupled to the first processor and adaptively coupled to a database;
  ii) a second server including a second processor and a second network interface coupled to the second processor and adaptively coupled to the database;
  iii) a diner device;
  iv) a restaurant service device including a screen, a third processor and a third network interface coupled to the third processor;
  v) a first server software application operating on the first processor, wherein the first server software application is adapted to:
    1) receive an unconfirmed catering order from the diner device over the first network interface, wherein the unconfirmed catering order is a catering order that has yet to be acknowledged by one or more serving restaurants of the catering order and that includes a set of catering order items; and
    2) store the unconfirmed catering order into the database,
  vi) a second server software application operating on the second processor, wherein the second server software application is adapted to retrieve the unconfirmed catering order from the database and send the unconfirmed catering order to the restaurant service device over the second network interface;
  vii) a third software application operating on the third processor, wherein the third restaurant software application is adapted to:
    1) receive the unconfirmed catering order over the third network interface;
    2) display the unconfirmed catering order on the screen of the restaurant service device with a graphical icon indicating that the unconfirmed catering order is a catering order, wherein the graphical icon is displayed in a first color;
    3) constantly monitor a time difference between an order receive time of the unconfirmed catering order and a current time and detect when the time difference exceeds a predetermined amount of time during which the unconfirmed catering order remained unconfirmed;
    4) in response to the detecting, automatically display the graphical icon in a second color comprising warning information that is viewable on the screen by a user, wherein the warning information indicates that the unconfirmed catering order remains unconfirmed.

\* \* \* \* \*